(12) United States Patent
Thayer

(10) Patent No.: US 8,615,653 B2
(45) Date of Patent: Dec. 24, 2013

(54) METHODS AND SYSTEMS FOR DYNAMIC UPDATES OF DIGITAL CERTIFICATES VIA SUBSCRIPTION

(75) Inventor: Wayne Thayer, Phoenix, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 2242 days.

(21) Appl. No.: 10/932,281

(22) Filed: Sep. 1, 2004

(65) Prior Publication Data
US 2006/0047950 A1 Mar. 2, 2006

(51) Int. Cl.
*H04L 9/06* (2006.01)
(52) U.S. Cl.
USPC .......................................... 713/156; 713/155
(58) Field of Classification Search
USPC ..................... 713/156, 175; 705/76; 380/277
See application file for complete search history.

(56) References Cited

U.S. PATENT DOCUMENTS

| | | | |
|---|---|---|---|
| 5,657,390 A | 8/1997 | Elgamal et al. | |
| 5,903,882 A | 5/1999 | Asay et al. | |
| 5,996,076 A * | 11/1999 | Rowney et al. | 713/156 |
| 6,233,577 B1 * | 5/2001 | Ramasubramani et al. | 1/1 |
| 6,370,249 B1 | 4/2002 | Van Oorschot | |
| 6,516,316 B1 * | 2/2003 | Ramasubramani et al. | 1/1 |
| 6,981,139 B2 | 12/2005 | Enokida | |
| 7,073,057 B2 | 7/2006 | Moses et al. | |
| 7,114,177 B2 | 9/2006 | Rosenberg et al. | |
| 7,657,748 B2 * | 2/2010 | Gentry | 713/170 |
| 2001/0011255 A1 * | 8/2001 | Asay et al. | 705/76 |
| 2001/0049786 A1 | 12/2001 | Harrison et al. | |
| 2002/0138725 A1 * | 9/2002 | Moses et al. | 713/156 |
| 2002/0152382 A1 * | 10/2002 | Xiao | 713/173 |
| 2003/0023878 A1 | 1/2003 | Rosenberg et al. | |
| 2003/0065921 A1 | 4/2003 | Chang | |
| 2003/0126431 A1 | 7/2003 | Beattie et al. | |
| 2004/0039911 A1 * | 2/2004 | Oka et al. | 713/175 |
| 2004/0049675 A1 | 3/2004 | Micali et al. | |
| 2004/0068650 A1 | 4/2004 | Resnitzky et al. | |
| 2004/0148505 A1 * | 7/2004 | Qiu | 713/175 |
| 2004/0215959 A1 * | 10/2004 | Cook et al. | 713/156 |

(Continued)

OTHER PUBLICATIONS

Sun Microsystems, Inc., "iPlanet Certificate Management System Installation and Setup Guide," Oct. 2002. Chapter 1 and Chapter 24.*

(Continued)

*Primary Examiner* — Luu Pham
(74) *Attorney, Agent, or Firm* — Sergey G. Zaytsev; Chris A. Watt

(57) ABSTRACT

Methods and systems of the present invention allow for dynamic updates of digital certificates, such as X.509 SSL certificates. The updates are available via a subscription, where the subscription is a technical, administrative, and/or financial arrangements between a Subscriber and a Certification Authority or between a Hosting Provider and the Certification Authority, which allow for dynamic, and in some embodiments automatic, updates of the Subscriber's certificate. The Subscriber regularly requests updates from the Certification Authority (pull-type methods and systems) or the Certification Authority updates certificates on Subscriber's servers (push-type methods and systems). The invention anticipates a use of short lifespan certificates, which substantially overcomes the issues connected to revoked certificates. If a certificate was revoked it will shortly expire and the Certification Authority would not update it. Also, if the private key was compromised, the person who obtained the private key would have very limited amount of time to exploit it. The invention adds more protection to the Subscribers and their clients.

12 Claims, 14 Drawing Sheets

(56) References Cited

U.S. PATENT DOCUMENTS

| | | |
|---|---|---|
| 2004/0250075 A1 | 12/2004 | Anthe et al. |
| 2005/0015586 A1 | 1/2005 | Brickell et al. |
| 2005/0069136 A1* | 3/2005 | Thornton et al. ............ 380/277 |
| 2005/0076199 A1 | 4/2005 | Thornton et al. |
| 2005/0081026 A1 | 4/2005 | Thornton et al. |
| 2005/0091484 A1* | 4/2005 | Thornton et al. ............ 713/156 |
| 2005/0191990 A1* | 9/2005 | Willey et al. ................. 455/411 |
| 2005/0228998 A1 | 10/2005 | Chan et al. |
| 2005/0246533 A1* | 11/2005 | Gentry .......................... 713/170 |
| 2006/0015716 A1* | 1/2006 | Thornton et al. ............ 713/155 |
| 2006/0015729 A1 | 1/2006 | Novack et al. |
| 2006/0155855 A1* | 7/2006 | Hamai .......................... 709/227 |
| 2007/0022477 A1 | 1/2007 | Larson |

OTHER PUBLICATIONS

Naor et al., "Certificate Revocation and Certificate Update," Apr. 2000, IEEE, pp. 561-571.*

Kapidzic et al., "A Certificate Management System: Structure, Functions and Protocols," 1995, IEEE, pp. 158-161.*

Gao et al., "Design and Completion of Digital Certificate with Authorization Based on PKI," 2004, IEEE, pp. 462-497.*

Dankers et al., "Publick Key Infrastructure in Mobile System," Oct. 2002, IEEE, pp. 180-191.*

Nystrom and Kaliski. PKCS #10: Certification Request Syntax Specification. RFC 2986. http://www.ietf.org/rfc/rfc2986.txt. Nov. 2000.

Myers, et al. X.509 Internet Public Key Infrastructure. Online Certificate Status Protocol—OCSP. RFC 2560. http://www.ietf.org/rfc/rfc2560.txt. Jun. 1999.

Fratto. Certificate Revocation: When Not to Trust. Network Computing. http://www.networkcomputing.com/1112/1112ws1.html. Jun. 26, 2000.

Technical Information—Root Expiry. Entrust.Net. http://www.auznic.net/digcerts/rootexpiry.pdf. 2000.

Hayes, J.M. Secure In-band Update of Trusted Certificates, IEEE 1999, 8th International Workshops on Jun. 16-18, 1999; pp. 168-173, Jun. 1999.

Namje Park, Kiyoung Moon, Sungwon Sohn Certificate Validation Service using XKMS for Computational Grid, Proceedings of the 2003 ACM workshop on XML security; pp. 112-120, 2003.

Sun Microsystems, Inc., iPlanet Certificate Management System 42-SP2 Installation and Setup Guide, Chapter 17 Scheduling Automated Jobs. Apr. 2, 2001.

Sep. 6, 2012 Appeal Brief in related U.S. Appl. No. 10/931,826.

Jun. 7, 2012 office action in related U.S. Appl. No. 10/931,826.

* cited by examiner

METHODS AND SYSTEMS FOR DYNAMIC UPDATES OF DIGITAL CERTIFICATES VIA SUBSCRIPTION

CROSS REFERENCE TO RELATED PATENT APPLICATIONS

This patent application is related to the following patent application concurrently filed herewith, all assigned to The Go Daddy Group, Inc:

U.S. patent application Ser. No. 10/931,826, "METHODS AND SYSTEMS FOR DYNAMIC UPDATES OF DIGITAL CERTIFICATES WITH HOSTING PROVIDER".

FIELD OF THE INVENTION

The present invention relates, in general, to secure communications over computer networks and, in particular, to public key infrastructure methods and systems.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding webpages on the Internet is generally known as the World Wide Web (WWW) or simply web.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or NETSCAPE NAVIGATOR. After the browser has located the desired webpage, it requests and receives information from the webpage, typically in the form of an HTML document, and then displays the webpage content for the user. The user may then view other webpages at the same website or move to an entirely different website using the browser.

Millions of Internet users obtain products and services online. Internet users want to be assured that their financial information is handled securely and is not available to "eavesdroppers." Increasing use and transmittal of confidential information over the Internet demand improved security measures for communications over the Internet.

Common mechanism for providing increased security includes the use of encrypted transactions using digital certificates. One widely used security protocol is the Secure Socket Layer (SSL) protocol which uses a hybrid public-key system in which public-key cryptography is used to allow a client and a server to securely agree on a secret session key.

SSL is a networking protocol developed by Netscape Communications Corp. and RSA Data Security, Inc. to enable secure network communications in a non-secure environment. More particularly, SSL is designed to be used in the Internet environment, where it operates as a protocol layer above the TCP/IP (Transmission Control Protocol/Internet Protocol) layers. The application code then resides above SSL in the networking protocol stack. After an application (such as an Internet browser) creates data to be sent to a peer in the network, the data is passed to the SSL layer where various security procedures are performed on it, and the SSL layer then passes the transformed data on to the TCP layer. On the receiver's side of the connection, after the TCP layer receives incoming data it passes that data upward to the SSL layer where procedures are performed to restore the data to its original form, and that restored data is then passed to the receiving application. The SSL protocol is further described in U.S. Pat. No. 5,657,390 entitled "Secure Socket Layer Application Program Apparatus and Method." Multiple improvements to the SSL protocol were made in the Transport Layer Security (TLS) protocol, which is intended to gradually replace the SSL.

The protocols underlying the Internet (TCP/IP, for example) were not designed to provide secure data transmission. The Internet was originally designed with the academic and scientific communities in mind, and it was assumed that users of the network would be working in non-adversarial, cooperative manners. As the Internet began to expand into a public network, usage outside these communities was relatively limited, with most of the new users located in large corporations. These corporations had the computing facilities to protect their users' data with various security procedures, such as firewalls, that did not require security to be built into the Internet itself. In the past several years, however, Internet usage has skyrocketed. Millions of people now use the Internet and the Web on a regular basis. These users perform a wide variety of tasks, from exchanging electronic mail messages to searching for information to performing business transactions. These users may access the Internet from home, from their cellular phone, or from a number of other environments where security procedures are not commonly available. To support the growth of the Internet as a viable place of doing business, often referred to as "electronic commerce" or simply "e-commerce", easily-accessible and inexpensive security procedures had to be developed. SSL is one popular solution, and is commonly used with applications that send and receive data using the HyperText Transfer Protocol (HTTP). HTTP is the protocol most commonly used for accessing that portion of the Internet referred to as the Web. When HTTP is used with SSL to provide secure communications, the combination is referred to as HTTPS. Non-commercial Internet traffic can also benefit from the security SSL provides. SSL has been proposed for use with data transfer protocols other than HTTP, such as Simple Mail Transfer Protocol (SMTP) and Network News Transfer Protocol (NNTP).

SSL is designed to provide several different but complementary types of security. First is message privacy. Privacy refers to protecting message content from being readable by persons other than the sender and the intended receiver(s). Privacy is provided by using cryptography to encrypt and decrypt messages. SSL uses asymmetric cryptography, also known as public-key cryptography (at least for establishing the connection or the so called "handshake"). A message receiver can only decrypt an encrypted message if the message creator used the message receiver's public key to encrypt the message and the message receiver uses his private key to decrypt the message.

Second, SSL provides data integrity for messages being transmitted. Data integrity refers to the ability for a message recipient to detect whether the message content was altered after its creation (thus rendering the message untrustworthy). A message creator passes the message through an algorithm which creates what is called a "message digest", or "message authentication code". This digest is sent along with the message. When the message is received, the receiver also processes the message through an algorithm, creating another digest. If the digest computed by the receiver does not match the digest sent with the message, then it can be assumed that the message contents were altered in some way after the message was created.

The third security feature SSL provides is known as authentication. Communications over the Internet take place as a sequence of electronic signals, without the communicating parties being able to see each other and visually determine with whom they are communicating. Authentication is a technique that helps to ensure that the parties are who they represent themselves to be, whether the party is a human user or an application program. For example, if a human user is buying goods over the Internet using a credit card, it is important for her/him to know that the application waiting on the other end of the connection for his credit card information is really the vendor he believes he is doing business with, and not an impostor waiting to steal his credit card information.

One advantage of SSL is that it is application protocol independent. A higher level protocol can layer on top of the SSL Protocol transparently. Thus, the SSL protocol provides connection security where encryption is used after an initial handshake to define a secret key for use during a session and where the communication partner's identity can be authenticated using, for example, a well known public certificate issuing authority. Examples of such well known Certification Authorities (CA) include Starfield Technologies, Inc., RSA Data Security, Inc., VERISIGN, and EQUIFAX.

Authentication is important in establishing the secure connection as it provides a basis for the client to trust that the server, typically identified by its Universal Resource Locator (URL), is the entity associated with the server public key provided to the client and used to establish the secret session key. As noted above, this authentication may be provided through the use of certificates obtained by the server from one of the well known Certification Authorities. The certificate (such as a X.509 certificate) typically includes an identification of the server (such as its hostname), the server's public key, and a digital signature which is provided by the well known Certification Authority. The digital signature is used by a client receiving the certificate from a server to authenticate the identity of the server before initiating a secured session. In particular, the application on the client initiating the secured communication session, such as an Internet browser, is typically installed with a public key ring including public keys for various well known Certification Authorities that allow the client to verify server certificates issued by these Certification Authorities.

FIG. 1 illustrates a prior art method and FIG. 3 illustrates a prior art system for obtaining a digital certificate. The system includes a Subscriber 301 (sometimes called a Requestor), a Certification Authority (CA) 303, and a Communication Link connecting the Subscriber 301 and the Certification Authority 303 (shown on the diagram as a plurality of steps). The method includes the following steps. The Subscriber 301 generates a Certificate Signing Request (CSR) on its server (Step 101). The Subscriber 301 submits the CSR to the Certification Authority 303 (Step 103). The Subscriber 301 receives a certificate from the Certification Authority (Step 105) and installs the certificate on its server (Step 107).

The communications between the Subscriber 301 and the Certification Authority 303 over the Communication Link may include, inter alia, electronic communications via computer networks, telephone communications, and fax communications.

FIG. 2 illustrates an alternative prior art method and FIG. 4 illustrates an alternative prior art system for obtaining a digital certificate. The system includes a Subscriber 301, a Certification Authority 303, a Hosting Provider 401, a Communication Link connecting the Subscriber 301 and the Certification Authority 303, and a Second Communication Link connecting the Subscriber 301 and the Hosting Provider 401 (shown on the diagram as a plurality of steps between the Subscriber 301 and the Hosting Provider 401). The Hosting Provider 401 is an entity that provides hosting services for the Subscriber's website and/or other data. The method includes the following steps. The Subscriber 301 requests the Hosting Provider 401 to generate a CSR (Step 201). The Hosting Provider 401 generates the CSR (Step 203). The Subscriber 301 receives the generated CSR from the Hosting Provider 401 (Step 205). The Subscriber 301 submits the CSR to the Certification Authority 303 (Step 103). The Subscriber 301 receives a certificate from the Certification Authority (Step 105). The Subscriber 301 forwards the certificate to the Hosting Provider 401 (Step 207) and the Hosting Provider 401 installs the certificate on its server (Step 209).

One of the advantages of the SSL protocol is that a Client does not need to verify with a Certification Authority if it issued a certificate to a Subscriber. The certificate, located on a Subscriber's website, is signed by the Certification Authority using the Certification Authority's private key, thus the Client is assured that the certificate was issued by the signing Certification Authority. However, the presence of the certificate on the Subscriber's website does not guaranty that the certificate was not revoked later on.

Revoked certificates impose a major challenge for the SSL protocol. The certificates can be revoked for multiple reasons. A common reason for certificates to be revoked is that the private key of the Subscriber was lost or compromised. A third party may impersonate the Subscriber if it obtains the Subscriber's private key. Other reasons for the revocation of a certificate include situations where a Subscriber obtained a certificate fraudulently (e.g. by providing false information), a Subscriber needs to change some information in the certificate, or a Subscriber is no longer in business.

The available solutions for handling certificate revocations include the Certificate Revocation List (CRL) and the Online Certificate Status Protocol (OCSP). The CRL is a list of revoked certificates; the list is published and signed by the issuing Certification Authority. The OCSP is an online protocol that allows querying the Certification Authority to obtain the status of a certificate. Both of the solutions are hard to implement and use. The CRL is typically a large file and Clients are thus reluctant to upload it on a regular basis. The OCSP is not supported by all CAs yet and is not supported or enabled in the most popular Internet browsers, such as MICROSOFT INTERNET EXPLORER and NETSCAPE NAVIGATOR. MICROSOFT INTERNET EXPLORER will not support the OCSP until the release of Longhorn, currently expected in 2006. If and when the OCSP is going to be enabled on popular Internet browsers, the CAs are expected to get hit with an overwhelming number of requests for verification of certificate statuses. The fact that each response to the request for the certificate status must be digitally signed by the Certification Authority makes it even more difficult for the Certification Authority to handle a large number of requests.

None of those solutions provide an efficient way of dealing with the issue of certificate revocations.

Another concern, which is not addressed in the prior art, is the possible scenario where the signing private key of a Certification Authority is compromised. In this scenario all certificates issued by the Certification Authority and signed with a later compromised key must be revoked. Currently there is no mechanism available to replace all the certificates that the Certification Authority issued to its Subscribers.

Therefore, new methods and systems are needed to overcome the limitations of the current methods and systems. It is desired to create methods and systems that provide more efficient solutions for handling certificate revocations and improving security.

SUMMARY OF THE INVENTION

The limitations cited above and others are substantially overcome through the methods and systems disclosed herein. The methods and systems of the present invention allow dynamic updates of Subscribers' certificates.

The methods and systems of the present invention allow a Subscriber to regularly update its digital certificate via a subscription. The subscription is a technical, administrative, and/or financial arrangements between the Subscriber and a Certification Authority (CA) or between a Hosting Provider and the Certification Authority, which allow for dynamic, and in some embodiments automatic, updates of the Subscriber's certificate.

One embodiment of the present invention allows the Subscriber or the Hosting Provider to generate and submit a Request for Update of a Subscriber's certificate to a Certification Authority on a regular basis. The Certification Authority may issue a subsequent certificate and send it to the Subscriber or the Hosting Provider. A method includes the steps of generating a CSR, submitting the CSR to the Certification Authority, receiving a first certificate from the Certification Authority, installing the first certificate on the Subscriber's or the Hosting Provider's server. Then regularly updating a current certificate (obtaining a subsequent certificate) by generating a Request for Update and submitting the Request for Update to the Certification Authority. Receiving the subsequent certificate from the Certification Authority and installing the subsequent certificate on the Subscriber's or the Hosting Provider's server.

Alternatively, a Certification Authority may regularly issue the subsequent certificates and push them to the Subscriber's or the Hosting Provider's server.

The certificates in the proposed methods and systems have a short lifespan, thus the Certification Authority would periodically issue the subsequent certificate before the current certificate expired. Short lifespan certificates address the issues of certificate revocation. If a certificate was revoked, the Subscriber or the Hosting Provider would not be able to update it and the Subscriber's current certificate would simply expire.

The above features and advantages of the present invention will be better understood from the following detailed description taken in conjunction with the accompanying drawings.

DETAILED DESCRIPTION AND PREFERRED EMBODIMENT

Figure 1:
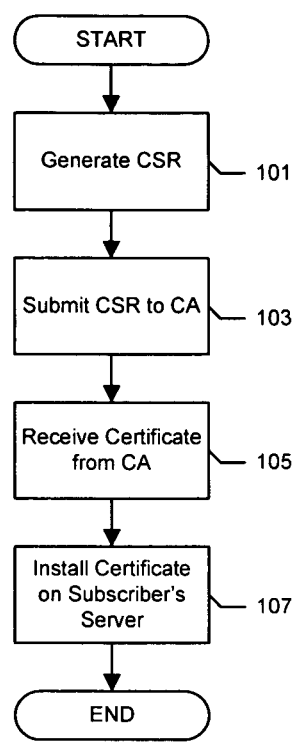
FIG. 1 is a flowchart illustrating a prior art method of obtaining a digital certificate by a Subscriber.
Figure 2:
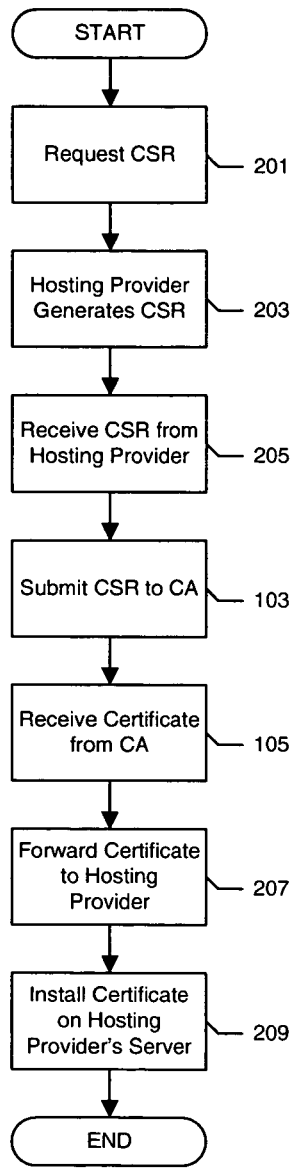
FIG. 2 is a flowchart illustrating a prior art method of obtaining a digital certificate by a Subscriber, where a Hosting Provider hosts Subscriber's website.
Figure 3:
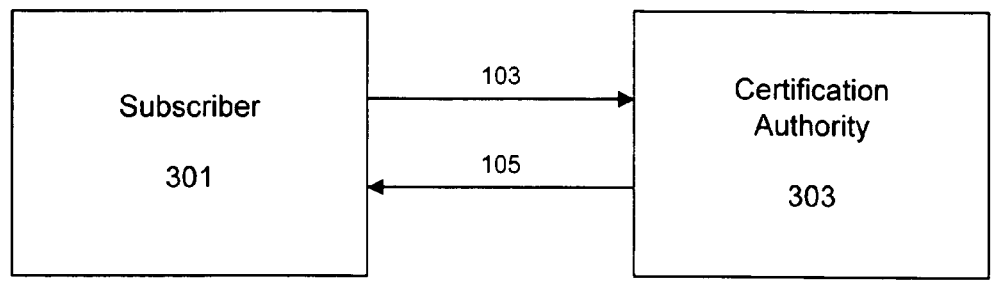
FIG. 3 is a block diagram illustrating a prior art system for implementing the method of FIG. 1.
Figure 4:
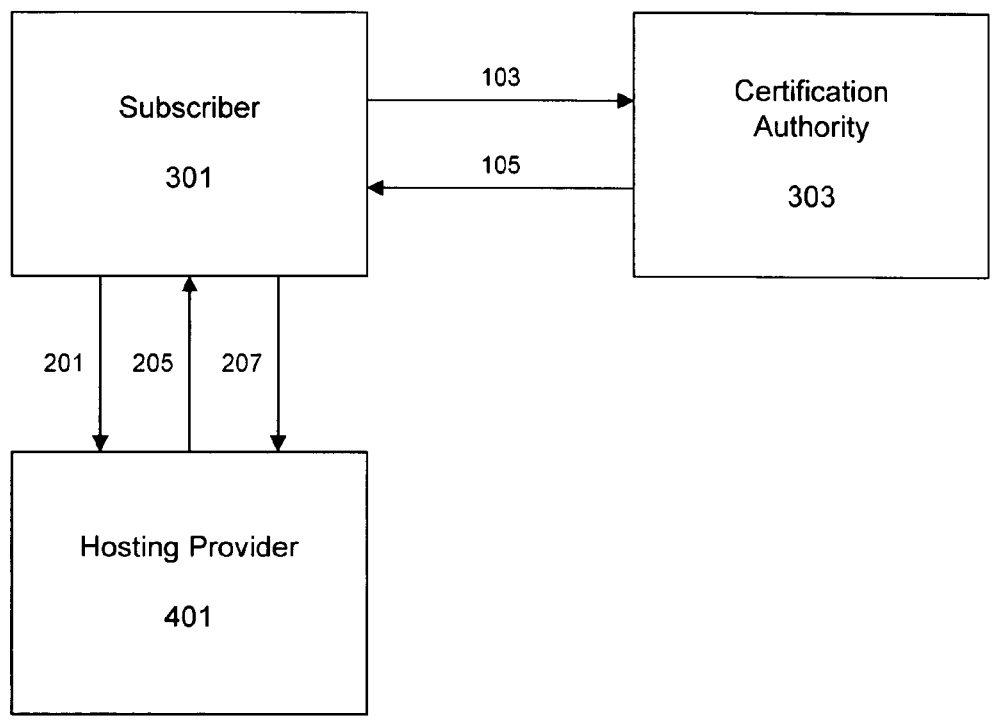
FIG. 4 is a block diagram illustrating a prior art system for implementing the method of FIG. 2.

The present invention will now be discussed in detail with regard to the attached drawing figures which were briefly described above. In the following description, numerous specific details are set forth illustrating Applicant's best mode for practicing the invention and enabling one of ordinary skill in the art to make and use the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Figure 5:
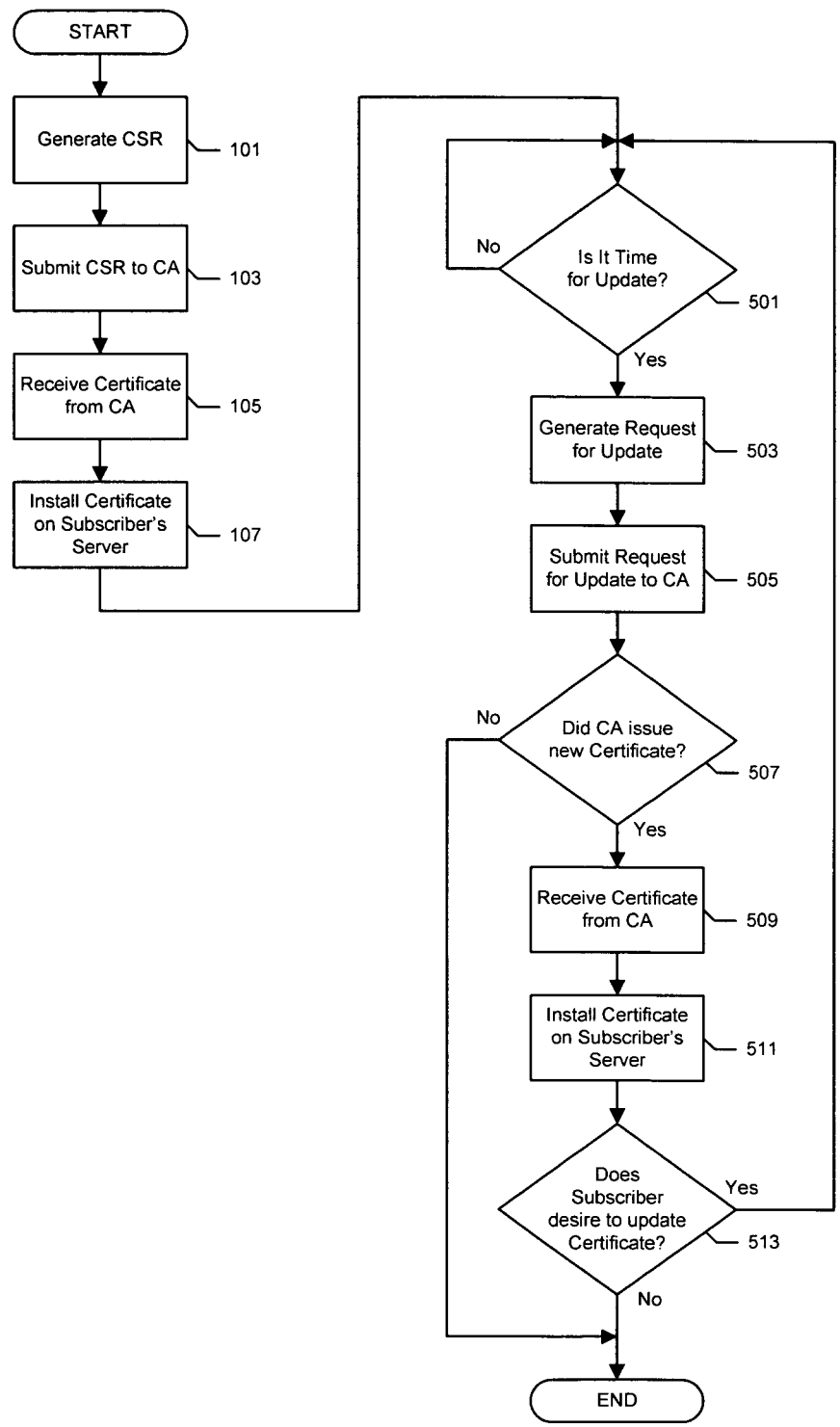
FIG. 5 is a flowchart illustrating a method of the present invention, where certificates are updated using a "pull" technique.
Figure 11:
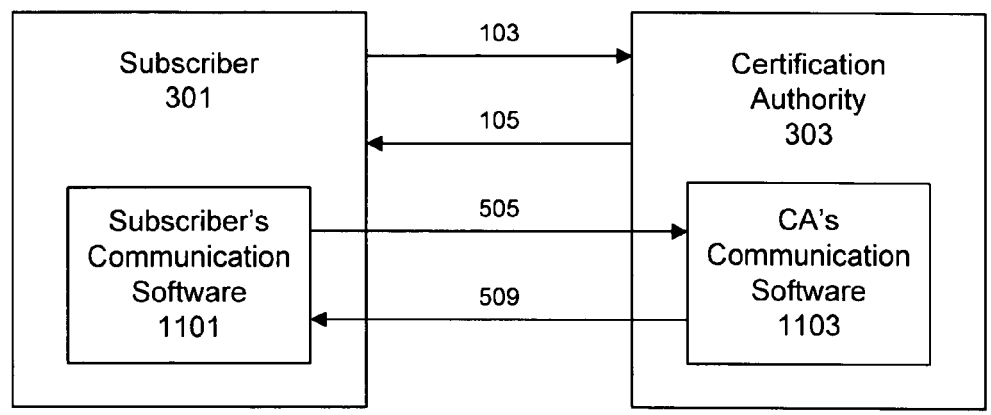
FIG. 11 is a block diagram illustrating a system of the present invention for implementing the method of FIG. 5.

FIG. 5 depicts a method in accordance with the teachings of the present invention. FIG. 11 illustrates a sample system for implementing the method of FIG. 5. The system includes a Subscriber 301 (sometimes called a Requestor), a Certification Authority (CA) 303, a First Communication Link connecting the Subscriber 301 and the Certification Authority 303 (shown on the diagram as a plurality of steps between the Subscriber 301 and the Certification Authority 303), a Subscriber's Communication Software 1101, a Certification Authority (CA's) Communication Software 1103, and a Second Communication Link connecting the Subscriber's Communication Software 1101 and the CA's Communication Software 1103 (shown on the diagram as a plurality of steps between the Subscriber's Communication Software 1101 and the CA's Communication Software 1103).

The Subscriber 301 may be, for example, an individual, company, organization, or website. The Certification Authority 303 may be, for example, an individual, company, organization, or even computer that provides digital certificates.

However, the Certification Authority 303 is, preferably, an authorized entity trusted by many clients. The First Communication Link is a communication link or links established for the purpose of obtaining a first certificate. The Second Communication Link is a communication link or links established for the purpose of updating a current certificate (obtaining a subsequent certificate). The First and Second Communication Links may be, for example, established via a computer network and a telephone network or combinations thereof. The computer network may include Local Area Network (LAN), Wide Area Network (WAN), and global area networks, such as the Internet, or combinations thereof. The telephone network may include the Public Switched Telephone Network (PSTN), Plain Old Telephone Service (POTS) network, Integrated Services Digital Network (ISDN), Digital Subscriber Line (DSL) network, Asymmetric Digital Subscriber Line (ADSL) network, Private Branch Exchange (PBX) network, and Internet Protocol (IP) network, or combinations thereof.

The Subscriber 301 and the Certification Authority 303 may exchange electronic, voice, and fax communications via the First and Second Communication Links.

The above examples of communication links and types of communications are provided here for illustrative proposes only and are not limiting. Exchanging hard copies of the documents via mail or carrier may be part of the First and Second Communication Links as well.

The method of FIG. 5 includes the following steps. The Subscriber 301 generates a Certificate Signing Request (CSR) on its server (Step 101). The Subscriber 301 submits the CSR to the Certification Authority 303 (Step 103). The Subscriber 301 receives a first certificate from the Certification Authority 303 (Step 105) and installs the first certificate on its server (Step 107). Then the Subscriber 301 starts updating a current certificate (obtaining a subsequent certificate) on a regular basis. The Subscriber 301 checks if it is time for updating the current certificate (Step 501). If it is not time, the method repeats Step 501. Otherwise, the Subscriber 301 generates a Request for Update (Step 503), submits the Request for Update to the Certification Authority 303 (Step 505). If the Certification Authority 303 did not issue a subsequent certificate (Step 507) the method would end, if the Certification Authority 303 issued the subsequent certificate, the Certification Authority 303 sends the subsequent certificate to the Subscriber 301 (not shown on the flowchart). The Subscriber 301 receives the subsequent certificate (Step 509) and installs the subsequent certificate on its server (Step 511). If the Subscriber 301 desires to further update the current certificate (Step 513), the method would repeat itself starting with Step 501. If the Subscriber 301 does not desire to further update the current certificate (Step 513), the method would end.

The Subscriber may regularly update its digital certificates via a subscription. The subscription is a technical, administrative, and/or financial arrangements between the Subscriber and the Certification Authority or between a Hosting Provider and the Certification Authority, which allow for dynamic, and in some embodiments automatic, updates of the Subscriber's certificates.

The updates may happen periodically (e.g. every 24 hours) or based on a predetermined schedule. Alternatively, the time for updating in Step 501 may be calculated based on a predetermined time interval before the expiration time of the current certificate (e.g. two hours before the expiration).

The Certification Authority 303 may decide not to update the current certificate at Step 507 if the term of the subscription for updating the current certificate had expired or the Subscriber 301 did not comply with some legal requirement, etc.

For the purposes of the present patent application a first certificate means the earliest certificate obtained by a Subscriber from a Certification Authority. A subsequent certificate means one or more of the following: (1) a certificate obtained after the first certificate or (2) a next certificate obtained after a current certificate. The current certificate means one or more of the following: (1) a last or latest certificate obtained from the Certification Authority, (2) a certificate currently installed on a Subscriber's Server or a Hosting Provider's server, or (3) a certificate, which validity period covers a current point in time. The current certificate may be either the first certificate or the subsequent certificate.

Typically the Certification Authority 303 will issue the subsequent certificates to the Subscriber 301 with a short lifespan or validity period, such as one day, two days, one week, one month, etc. Because the current certificate has a short lifespan, the Subscriber 301 must regularly update the certificate (obtain a subsequent certificate). The subsequent certificate will be issued for the same distinguished name, but other parameters may be changed. The subsequent certificate may have different serial number, different validity dates and times, different private-public key pair, and different contact information. The Subscriber 301 may prepare a Request for Update, which may resemble a CSR. However, not all fields from the CSR need to be present in the Request for Update. The Certification Authority 303 may determine what information shall be present in the Request for Update. In many cases only the validity dates and times may be changed in the subsequent certificate, thus minimal amount of information may be required in the Request for Update. The Request for Update may include desirable validity dates and times of the subsequent certificate. The Certification Authority 303 may also require the Request for Update to be signed with the Subscriber's current private key. This will provide a higher level of assurance that the Request for Update is coming from the Subscriber 301.

In an alternative embodiment for FIG. 5, if the Certification Authority 303 did not issue the subsequent certificate (Step 507), the Subscriber 301 may: (a) resubmit the Request for Update (Step 505) or (b) regenerate the Request for Update (Step 503) and resubmit the Request for Update (Step 505) to the Certification Authority 303 (not shown on a flowchart).

The method of FIG. 5 and the system of FIG. 11 describe a "pull" technique for updating certificates, where the Subscriber 301 first submits a Request for Update and then receives a subsequent certificate. A "push" technique is utilized in the method of FIG. 6 and the system of FIG. 12.

Figure 12:
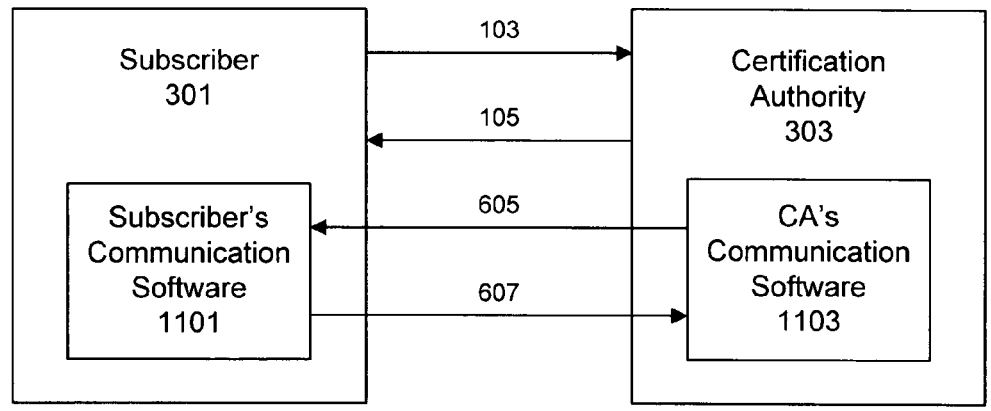
FIG. 12 is a block diagram illustrating a system of the present invention for implementing the method of FIG. 6.

The elements of the system of FIG. 12 are similar to the elements of the system of FIG. 11; the difference is in the steps that form the Second Communication Link.

Figure 6:
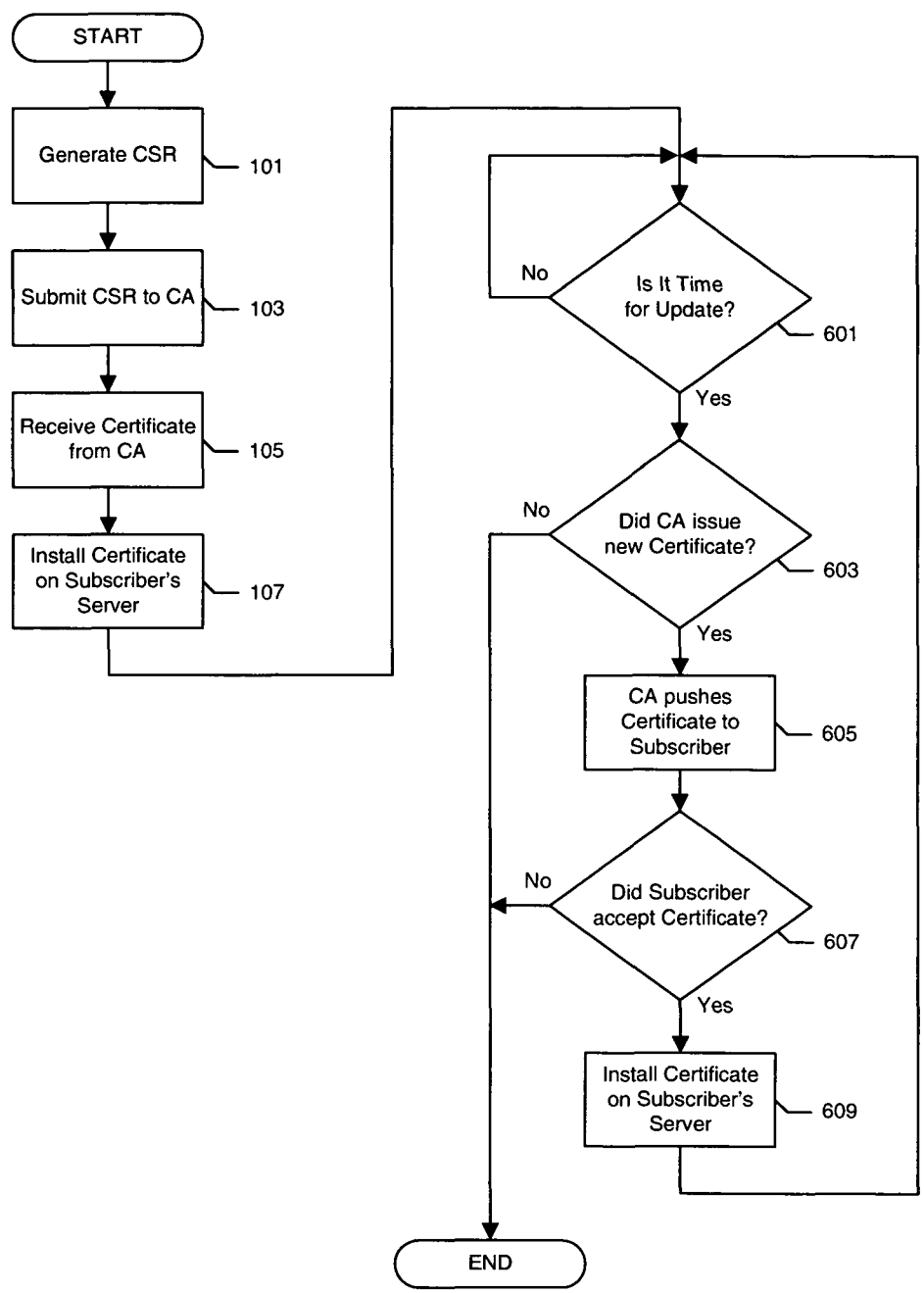
FIG. 6 is a flowchart illustrating a method of the present invention, where certificates are updated using a "push" technique.

The method of FIG. 6 includes the following steps. The Subscriber 301 generates a CSR on its server (Step 101). The Subscriber 301 submits the CSR to the Certification Authority 303 (Step 103). The Subscriber 301 receives a first certificate from the Certification Authority 303 (Step 105) and installs the first certificate on its server (Step 107). Then the Certification Authority 303 starts updating a current certificate (providing a subsequent certificate) on a regular basis. The Certification Authority 303 checks if it is time for updating the current certificate (Step 601). If it is not time, the method repeats Step 601. Otherwise, the Certification Authority 303 will decide if it should issue the subsequent certificate (Step 603). If the Certification Authority 303 decides not to issue the subsequent certificate, the method ends. If the Certification Authority 303 issues the subsequent certificate, the Certification Authority 303 will push the subsequent certificate to the Subscriber's server (Step 605). Optionally, the Subscriber 301 may provide feedback on the success on the delivery of the subsequent certificate (Step 607). If the delivery of the subsequent certificate was unsuccessful (e.g. it was an error message or no response from the Subscriber 301), then the method may end. Otherwise, the subsequent certificate will be installed on the Subscriber's server (Step 609). Then the method repeats itself starting with Step 601.

In an alternative embodiment for FIG. 6 (no flowchart provided), the Subscriber 301 generates a CSR on its server (Step 101). The Subscriber 301 submits the CSR to the Certification Authority 303 (Step 103). The Subscriber 301 receives a first certificate from the Certification Authority 303 (Step 105) and installs the first certificate on its server (Step 107). Then the Certification Authority 303 starts updating a current certificate (providing a subsequent certificate) on a regular basis. The Certification Authority 303 checks if the Certification Authority 303 should issue the subsequent certificate (e.g. term of subscription has not expired). If the Certification Authority 303 should not issue the subsequent certificate, the method ends. If the Certification Authority 303 should issue the subsequent certificate, the Certification Authority 303 checks if it is time for updating the current certificate (Step 601). If it is not time, the method repeats Step 601. Otherwise, the Certification Authority 303 issues the subsequent certificate. The Certification Authority 303 pushes the subsequent certificate to the Subscriber's server (Step 605). Optionally, the Subscriber 301 may provide feedback on the success of the delivery of the subsequent certificate (Step 607). If the delivery of the subsequent certificate was unsuccessful (e.g. it was an error message or no response from the Subscriber 301), then the method may end. Otherwise, the subsequent certificate will be installed on the Subscriber's server (Step 609). Then the method repeats itself starting with Step 601.

The following embodiments anticipate that the Subscriber 301 utilizes the services of a Hosting Provider for hosting its website.

Figure 7:
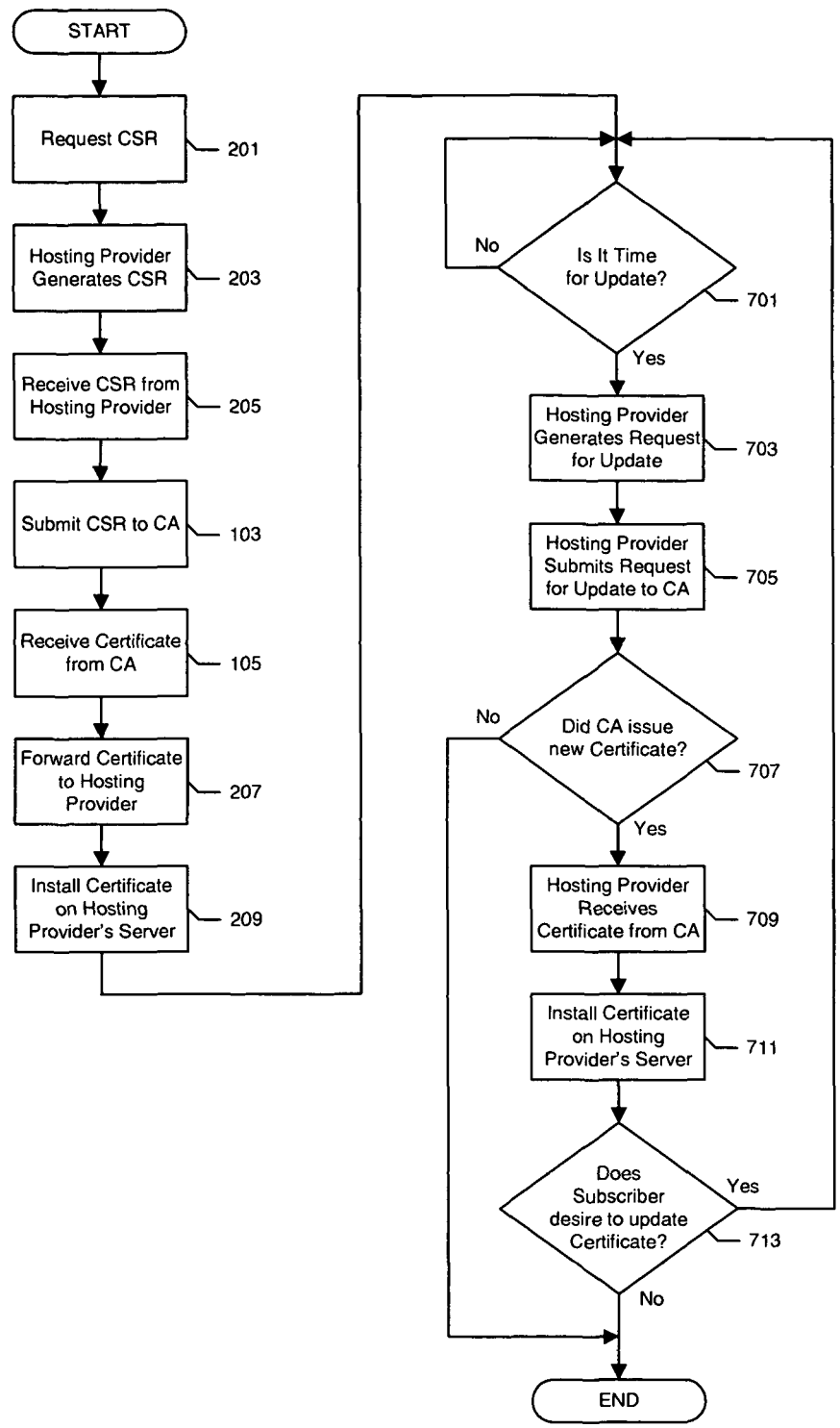
FIG. 7 is a flowchart illustrating a method of the present invention, where a Hosting Provider hosts a Subscriber's website and certificates are updated using a "pull" technique.
Figure 13:
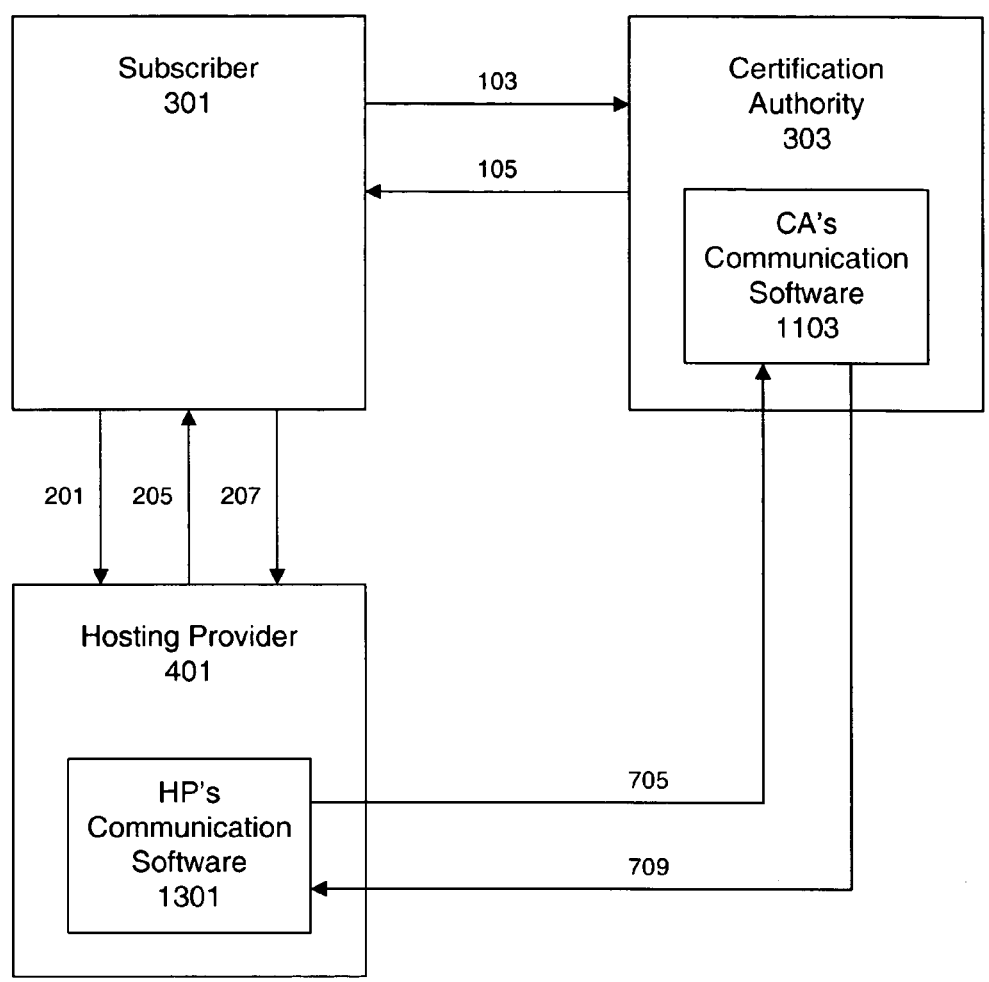
FIG. 13 is a block diagram illustrating a system of the present invention for implementing the method of FIG. 7.

FIG. 7 shows a "pull" method in accordance with the teachings of the present invention. FIG. 13 illustrates a sample system for implementing the method of FIG. 7. The system includes a Subscriber 301, a Certification Authority (CA) 303, a Hosting Provider 401, a Certification Authority (CA's) Communication Software 1103, a Hosting Provider's (HP's) Communication Software 1301, a First Communication Link connecting the Subscriber 301 and the Certification Authority 303 (shown on the diagram as a plurality of steps between the Subscriber 301 and the Certification Authority 303), a Second Communication Link connecting the Subscriber 301 and the Hosting Provider 401 (shown on the diagram as a plurality of steps between the Subscriber 301 and the Hosting Provider 401), a Third Communication Link connecting the HP's Communication Software 1301 and the CA's Communication Software 1103 (shown on the diagram as a plurality of steps between the HP's Communication Software 1301 and the CA's Communication Software 1103).

The CA's Communication Software 1103 and the HP's Communication Software 1301 may reside on servers, networks, and other technological means suitable for running communication software.

The method of FIG. 7 includes the following steps. The Subscriber 301 requests the Hosting Provider 401 to generate a CSR on its server (Step 201). The Hosting Provider 401 generates the CSR (Step 203) and sends it to the Subscriber 301. The Subscriber 301 receives the CSR from the Hosting Provider 401 (Step 205) and submits the CSR to the Certification Authority 303 (Step 103). The Subscriber 301 receives a first certificate from the Certification Authority 303 (Step 105) and forwards the first certificate to the Hosting Provider 401 (Step 207). The Hosting Provider 401 installs the first certificate on its server (Step 209). Then the Hosting Provider 401 starts updating a current certificate (obtaining a subsequent certificate) using a Third Communication Link between HP's Communication Software 1301 and the CA's Communication Software 1103. The Hosting Provider 401 checks if it is time for updating the current certificate (Step 701). If it is not time, the method repeats Step 701. Otherwise, the Hosting Provider 401 generates a Request for Update (Step 703) and submits the Request for Update to the Certification Authority 303 (Step 705). If the Certification Authority 303 did not issue the subsequent certificate (Step 707) the method would end. If the Certification Authority 303 issued the subsequent certificate, the Certification Authority 303 sends the subsequent certificate to the Hosting Provider 401 (not shown on the flowchart). The Hosting Provider 401 receives the subsequent certificate (Step 709) and installs the subsequent certificate on its server (Step 711). If the Subscriber 301 desires to further update the current certificate (e.g. the Hosting Provider 401 did not receive any indication to the contrary from the Subscriber 301) (Step 713), the method would repeat itself starting with Step 701. If the Subscriber 301 does not desire to further update the current certificate (e.g. the Hosting Provider 401 knows that the Subscriber's subscription period for updating the current certificate had ended) (Step 713), the method would end.

Figure 8:
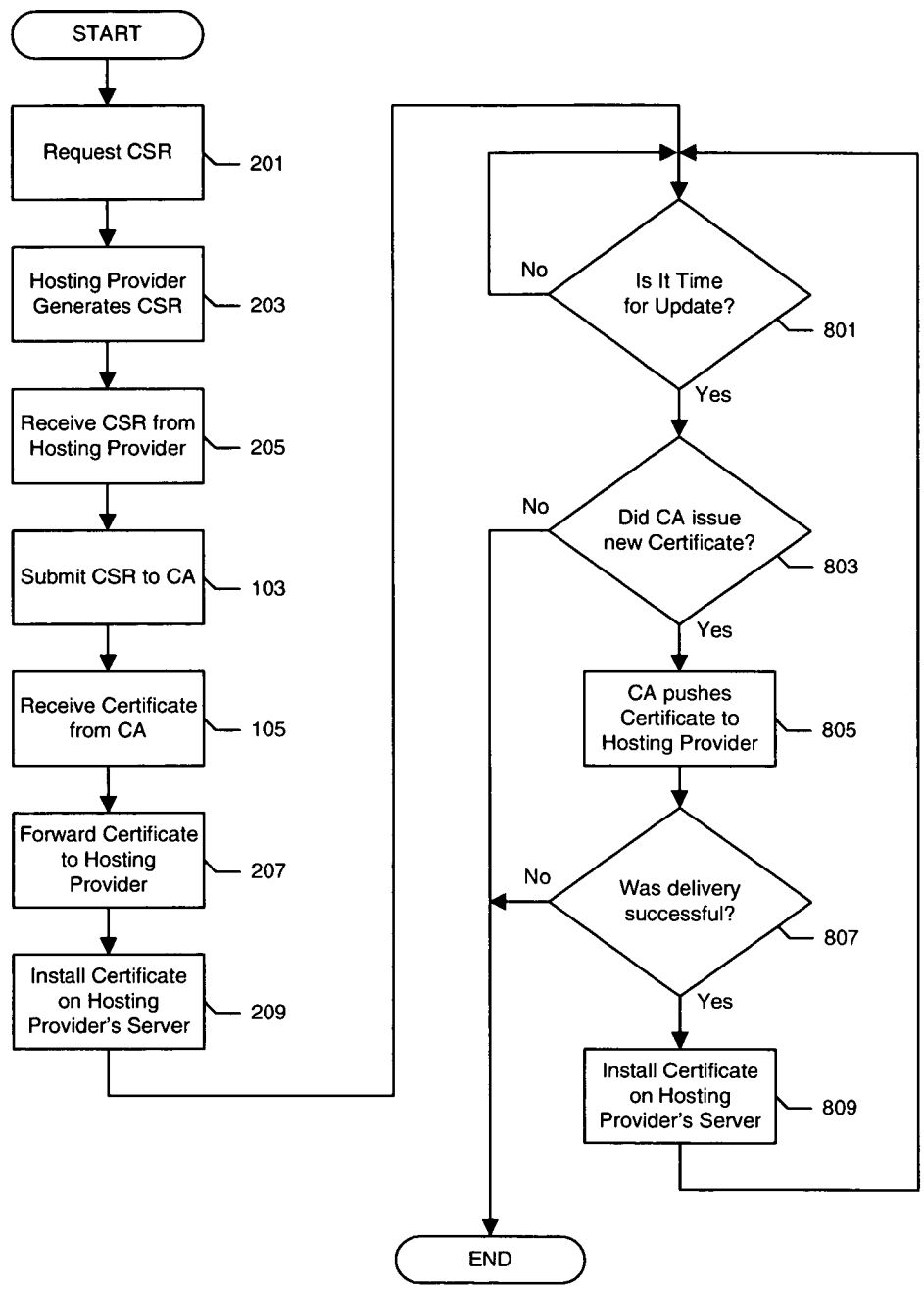
FIG. 8 is a flowchart illustrating a method of the present invention, where a Hosting Provider hosts a Subscriber's website and certificates are updated using a "push" technique.
Figure 14:
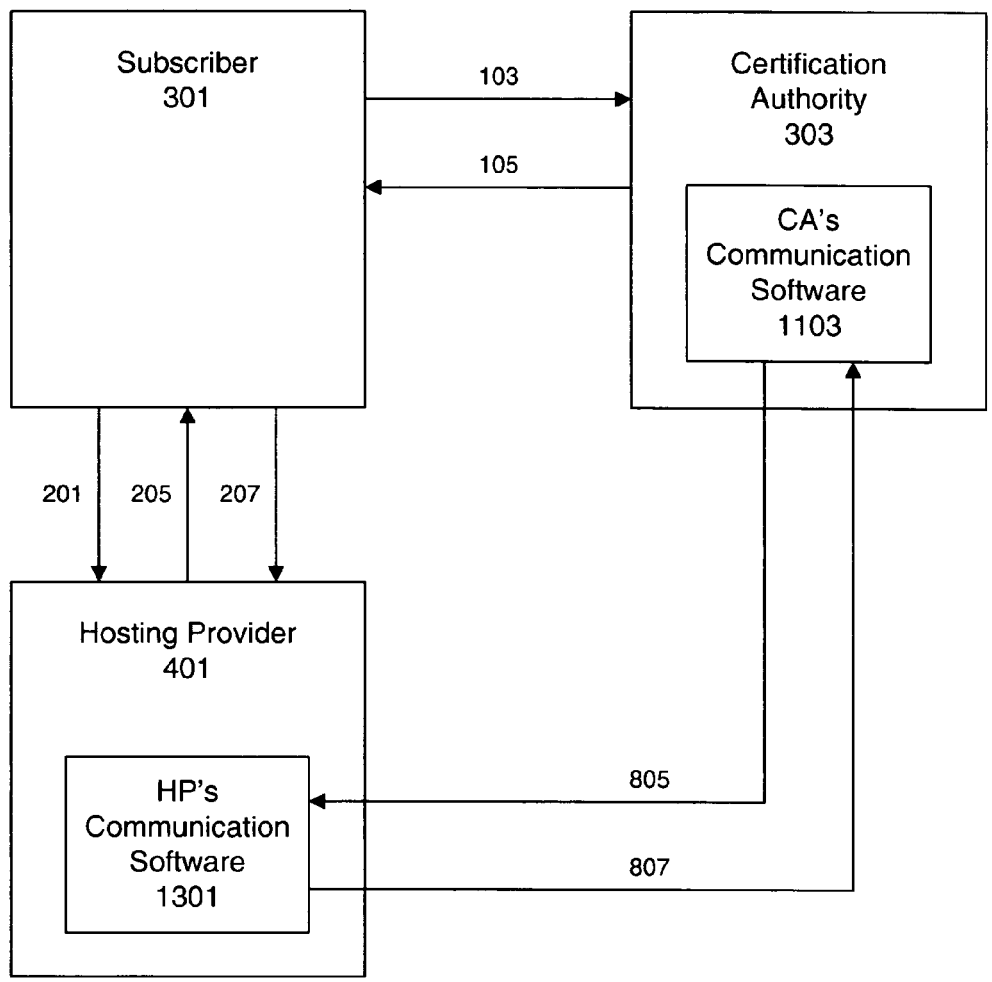
FIG. 14 is a block diagram illustrating a system of the present invention for implementing the method of FIG. 8.

Alternatively, a "push" method is illustrated in FIG. 8. FIG. 14 shows a sample system for implementing the method of FIG. 8. The system of FIG. 14 is similar to the one in FIG. 13; the difference is in the steps that form the Communication Link between the HP's Communication Software 1301 and the CA's Communication Software 1103.

The method of FIG. 8 includes the following steps. The Subscriber 301 requests the Hosting Provider 401 to generate a CSR on its server (Step 201). The Hosting Provider 401 generates the CSR (Step 203) and sends it to the Subscriber 301. The Subscriber 301 receives the CSR from the Hosting Provider 401 (Step 205) and submits it to the Certification Authority 303 (Step 103). The Subscriber 301 receives a first certificate from the Certification Authority 303 (Step 105) and forwards the first certificate to the Hosting Provider 401 (Step 207). The Hosting Provider 401 installs the first certificate on its server (Step 209). Then the Certification Authority 303 starts updating a current certificate (providing a subsequent certificate) using a Communication Link between HP's Communication Software 1301 and the CA's Communication Software 1103. The Certification Authority 303 checks if it is time for updating the current certificate (Step 801). If it is not time, the method repeats the Step 801. Otherwise, the Certification Authority 303 will decide if it should issue the subsequent certificate (Step 803). If the Certification Authority 303 decides not to issue the subsequent certificate, the method ends. If the Certification Authority 303 issues the subsequent certificate, the Certification Authority 303 will push it to the Hosting Provider's server (Step 805). Optionally, the HP's Communication Software 1301 may provide feedback on the success on the delivery of the subsequent certificate (Step 807). If the delivery of the subsequent certificate was unsuccessful (e.g. it was an error message or no response from the HP's Communication Software 1301), the method may end. Otherwise, the subsequent certificate will be installed on the Hosting Provider's server (Step 809). The method may repeat itself starting with Step 801.

In yet another embodiment, a Subscriber may authorize a Certification Authority or/and a Hosting Provider to communicate directly to each other for the purpose of obtaining a first certificate and installing the first certificate on the server of the Hosting Provider.

Figure 9:
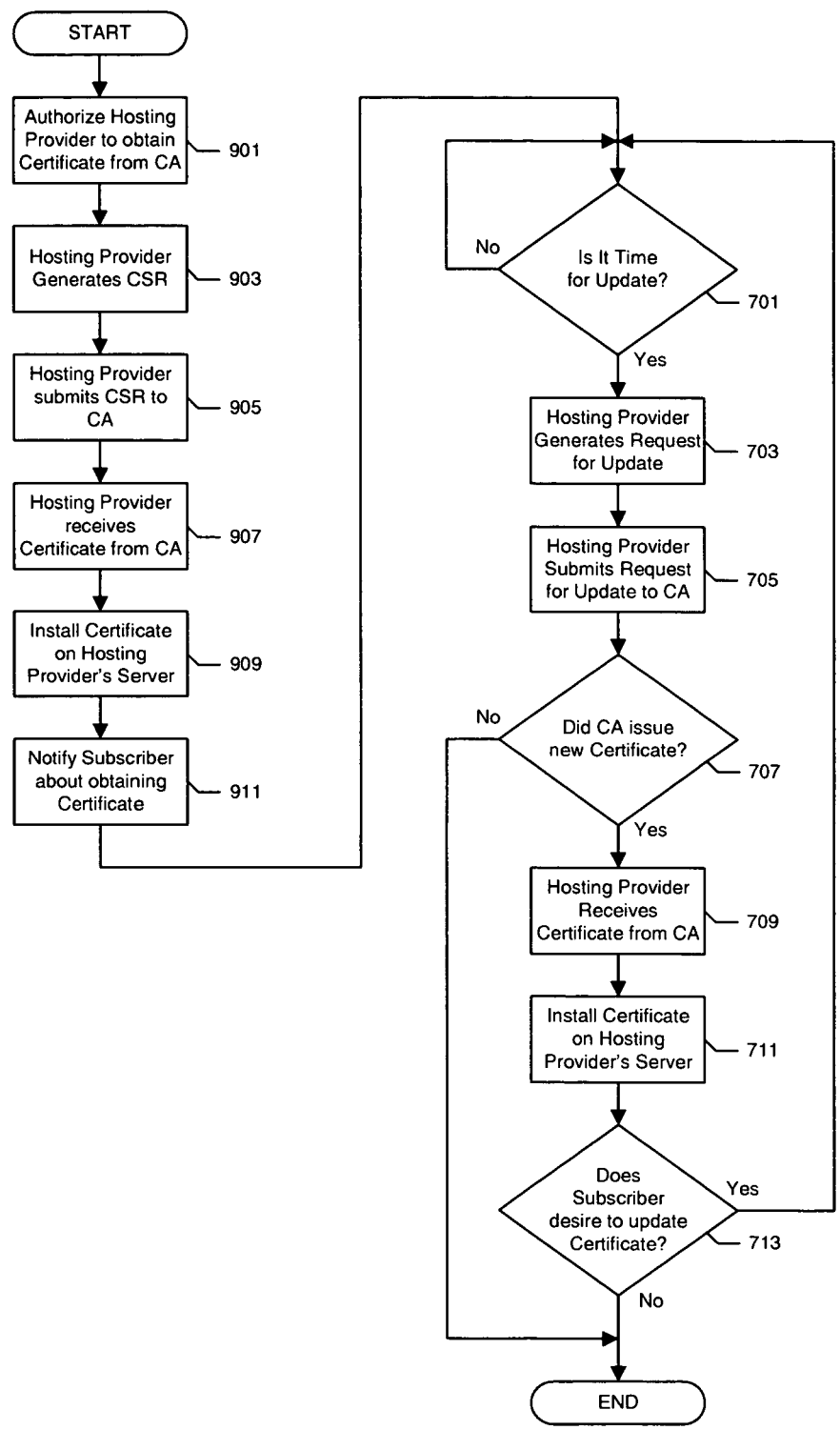
FIG. 9 is a flowchart illustrating a method of the present invention, where a Hosting Provider hosts a Subscriber's website, and a Subscriber authorized the Hosting Provider to obtain certificate directly from a Certification Authority, and certificates are updated using a "pull" technique.
Figure 15:
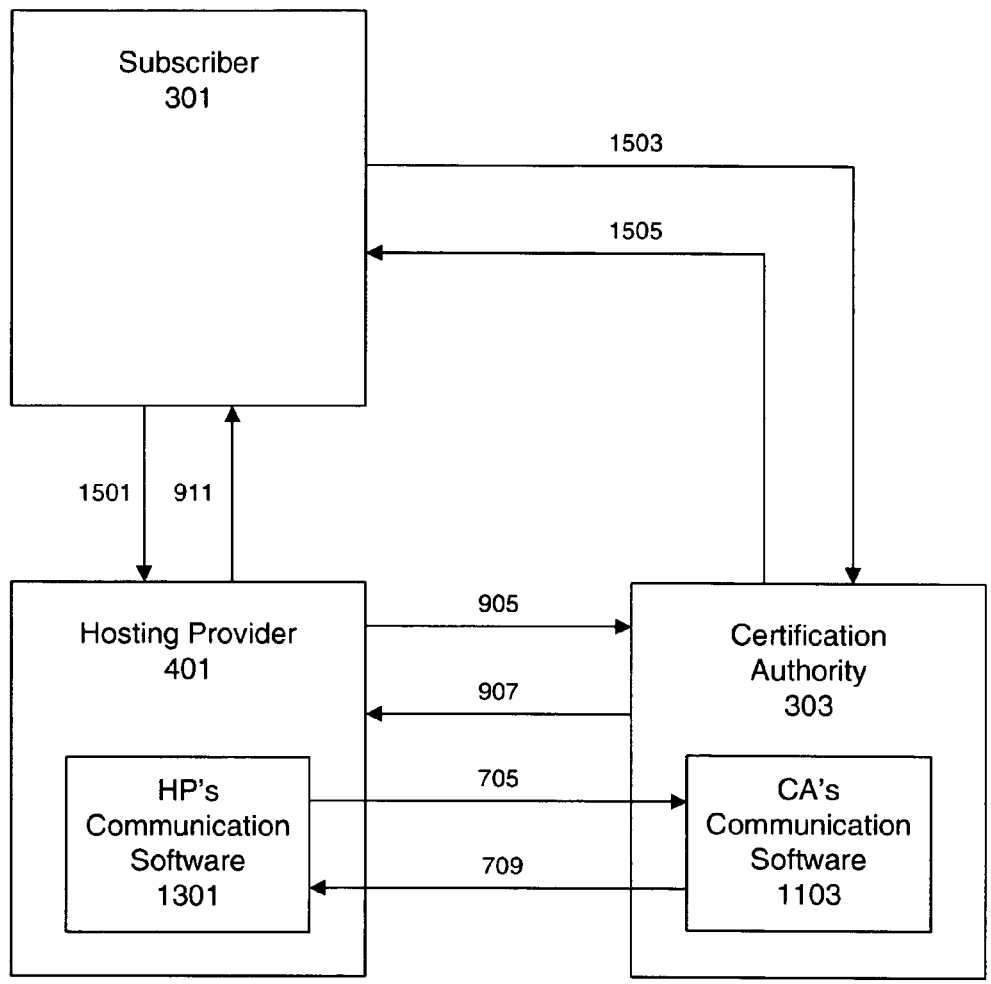
FIG. 15 is a block diagram illustrating a system of the present invention for implementing the method of FIG. 9.

FIG. 9 shows a "pull" method in accordance with the teachings of the present invention. FIG. 15 illustrates a sample system for implementing the method of FIG. 9. The system includes a Subscriber 301, a Certification Authority 303, a Hosting Provider 401, a Certification Authority (CA's) Communication Software 1103, a Hosting Provider's (HP's) Communication Software 1301, a First Communication Link connecting the Subscriber 301 and the Certification Authority 303 (shown on the diagram as a plurality of steps between the Subscriber 301 and the Certification Authority 303), a Second Communication Link connecting the Subscriber 301 and the Hosting Provider 401 (shown on the diagram as a plurality of steps between the Subscriber 301 and the Hosting Provider 401), a Third Communication Link connecting the HP's Communication Software 1301 and the CA's Communication Software 1103 (shown on the diagram as a plurality of steps between the HP's Communication Software 1301 and the CA's Communication Software 1103), a Fourth Communication Link connecting the Hosting Provider 401 and the Certification Authority 303 (shown on the diagram as a plurality of steps between the Hosting Provider 401 and the Certification Authority 303).

The method of FIG. 9 includes the following steps. The Subscriber 301 authorizes the Hosting Provider 401 to obtain a first certificate for the Subscriber 301 from the Certification Authority 303 (Step 901). The Hosting Provider 401 generates a CSR on its server (Step 903) and sends the CSR to the Certification Authority 303 (Step 905). The Hosting Provider 401 receives the first certificate from the Certification Authority 303 (Step 907) and installs the first certificate on its server (Step 909). Optionally, the Hosting Provider 401 may notify the Subscriber 301 with the results of obtaining the first certificate (Step 911). Then the Hosting Provider 401 starts updating a current certificate (obtaining a subsequent certificate) using the Third Communication Link between HP's Communication Software 1301 and the CA's Communication Software 1103. The Hosting Provider 401 checks if it is time for updating the current certificate (Step 701). If it is not time, the method repeats Step 701. Otherwise, the Hosting Provider 401 generates a Request for Update (Step 703) and submits the Request for Update to the Certification Authority 303 (Step 705). If the Certification Authority 303 did not issue the subsequent certificate (Step 707) the method would end. If the Certification Authority 303 issued the subsequent certificate, the Certification Authority sends the subsequent certificate to the Hosting Provider 401 (not shown on the flowchart). The Hosting Provider 401 receives the subsequent certificate (Step 709) and installs the subsequent certificate on its server (Step 711). If the Subscriber 301 desires to further update the current certificate (e.g. the Hosting Provider 401 did not receive any indication to the contrary from the Subscriber 301) (Step 713), the method would repeat itself starting with Step 701. If the Subscriber 301 does not desire to further update the current certificate (e.g. the Hosting Provider 401 knows that the Subscriber's subscription period for updating the current certificate had ended) (Step 713), the method would end.

Referring to FIG. 15, in an alternative embodiment the Subscriber 301 may authorize the Certification Authority 303 to obtain hosting for the Subscriber 301 from the Hosting Provider 401 (Step 1503). In yet another embodiment, the Subscriber 301 may choose the Certification Authority 303 and the Hosting Provider 401 and authorize both of them to communicate directly to each other for the purpose of obtaining a first certificate for the Subscriber 301 (Steps 1501 and 1503). Optionally, the Certification Authority 303 and/or the Hosting Provider 401 may notify the Subscriber 301 with the results of obtaining the first certificate (Steps 911 and 1505).

In some instances the Certification Authority 303 and the Hosting Provider 401 may have an ongoing business relationship or even be a single entity. In these cases the Subscriber 301 will obtain "a package" from the Certification Authority 303 and the Hosting Provider 401 (or a single entity), and some of the steps of obtaining a first certificate or subsequent certificates may be hidden from the Subscriber.

Figure 10:
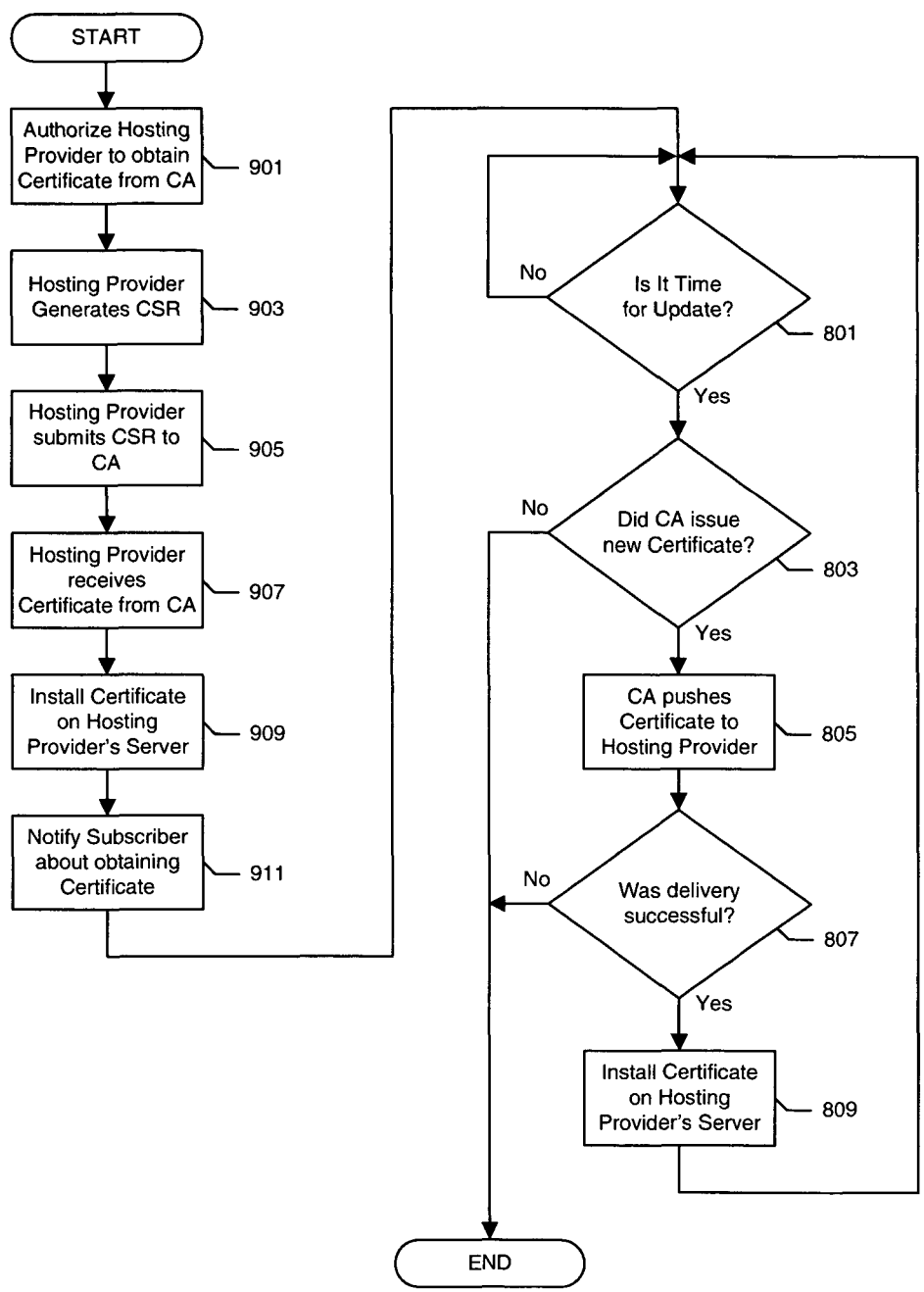
FIG. 10 is a flowchart illustrating a method of the present invention, where a Hosting Provider hosts a Subscriber's website, and a Subscriber authorized the Hosting Provider to obtain certificate directly from a Certification Authority, and certificates are updated using a "push" technique.
Figure 16:
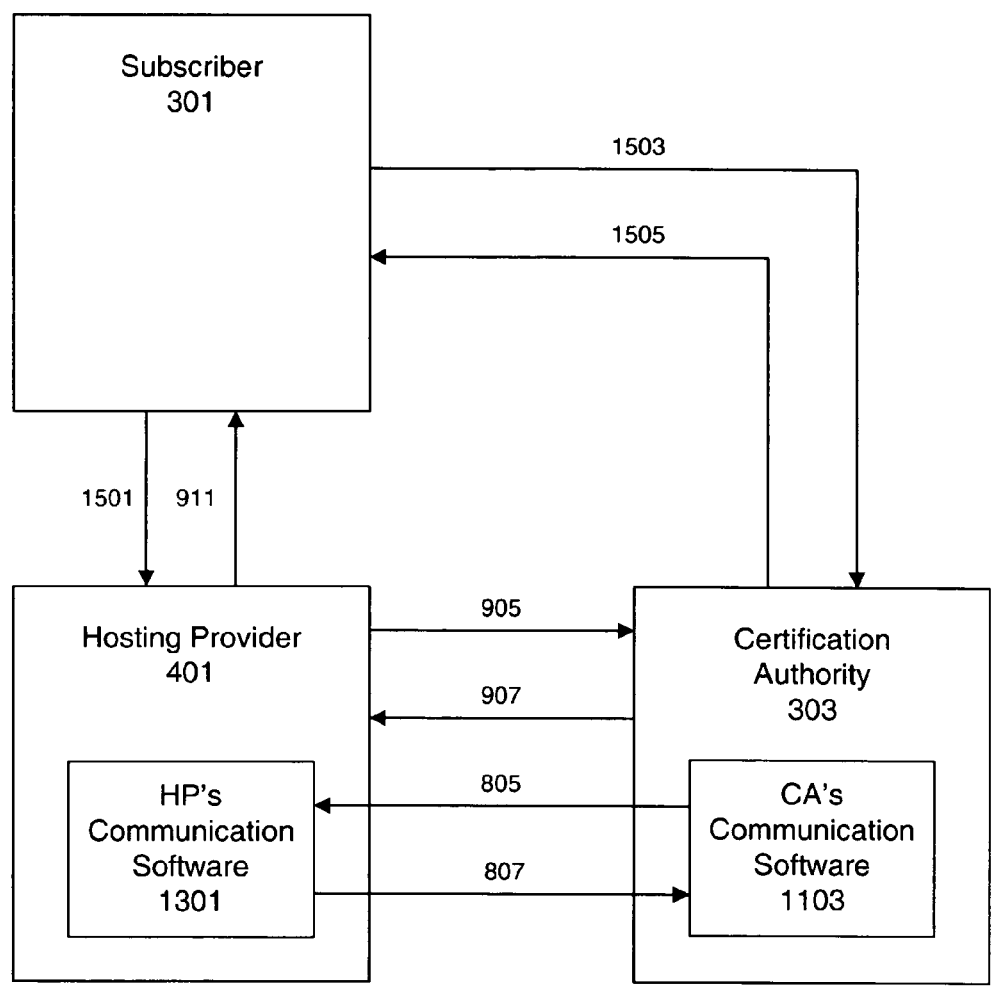
FIG. 16 is a block diagram illustrating a system of the present invention for implementing the method of FIG. 10.

FIG. 10 shows a "push" method in which a Subscriber 301 authorizes a Hosting Provider 401 to obtain a first certificate from a Certification Authority 303. FIG. 16 illustrates a sample system for implementing the method of FIG. 10. The system of FIG. 16 is similar to the system of FIG. 15; the difference is in the steps that form the Communication Link between the HP's Communication Software 1301 and the CA's Communication Software 1103.

The method of FIG. 10 includes the following steps. The Subscriber 301 authorizes the Hosting Provider 401 to obtain a first certificate for the Subscriber 301 from the Certification Authority 303 (Step 901). The Hosting Provider 401 generates a CSR on its server (Step 903) and sends the CSR to the Certification Authority 303 (Step 905). The Hosting Provider 401 receives a first certificate from the Certification Authority 303 (Step 907) and installs the first certificate on its server (Step 909). Optionally, the Hosting Provider 401 may notify the Subscriber 301 with the results of obtaining the first certificate (Step 911). Then the Certification Authority 303 starts updating a current certificate (providing a subsequent certificate) using a Communication Link between HP's Communication Software 1301 and the CA's Communication Software 1103. The Certification Authority 303 checks if it is time for updating the current certificate (Step 801). If it is not time, the method repeats Step 801. Otherwise, the Certification Authority 303 will decide if it should issue the subsequent certificate (Step 803). If the Certification Authority 303 decides not to issue the subsequent certificate, the method ends. If the Certification Authority 303 issues the subsequent certificate, the Certification Authority 303 will push the subsequent certificate to the Hosting Provider's server (Step 805). Optionally, the HP's Communication Software 1301 may provide feedback on the success of the delivery of the subsequent certificate (Step 807). If the delivery of the subsequent certificate was unsuccessful (e.g. it was an error message or no response from the HP's Communication Software 1301), the method may end. Otherwise, the subsequent certificate will be installed on the Hosting Provider's server (Step 809). Then the method repeats itself starting with Step 801.

The certificates may have some overlap in their lifespans. The overlap means that the validity start time of a subsequent certificate is earlier than the expiration date of a current certificate. If a certificate is intended for 1 day, it can be issued for 26 hours, where 2 hours is the time overlap with a subsequent certificate. This approach would ensure a gradual transfer from using one certificate to another.

If a current certificate was replaced during an open communication session between the Subscriber and its client, it would not affect the session. Typically, the current certificate and the Subscriber's private key are used only during the handshake (establishing the session). After the session is established, the Subscriber and its clients use randomly generated symmetrical keys, which provide better computing performance. Thus, changing the current certificate during an open session would not affect the session.

Currently, many steps of acquiring a certificate are done manually, however it may not be feasible in a system where updates must be obtained frequently. To address this issue the Certification Authority 301 (or another party) may provide the Subscriber 301 or the Hosting Provider 401 with a communication software that will be running on the Subscriber's server or on the server of the Hosting Provider employed by the Subscriber. Another piece of a communication software may be installed on the server of the Certification Authority 301, thus allowing regular updates of the Subscriber's certificate. Using the software program is not mandatory but would likely simplify the implementation of the present invention.

In some embodiments the Certification Authority 303 may have an option to decline the update of a current certificate if it determines that the updates are happening too soon. This measure may reduce a chance of a successful Denial of Service (DoS) attack based on resources or bandwidth consumption.

The short lifespan certificates may provide a higher level of protection to the Subscriber and its clients. Some embodiments of the present invention envision changing the private-public key pair of the subsequent certificates. In this scenario, if the private key of the Subscriber was compromised and the Subscriber was not aware of it, the person who obtained The Subscriber's private key would have only a limited amount of time to exploit it. Thus changing the private-public key pair of the short lifespan subsequent certificates adds another level of protection.

The described methods and systems address the issue of revoked certificates. Currently, users, performing what they think is a secure transaction on the Internet with popular Internet browsers, would not know if the certificate was revoked. Because of the short lifespan of the certificates in the proposed system, the users may receive a warning that the certificate expired.

It should be clear to a person skilled in the art that a single Subscriber described in the methods and systems of the present invention is a simplification. Typically the methods and systems would involve a plurality of Subscribers.

With the short lifespan certificates it is advantageous that the Clients' computer clocks are properly set. Client software may give the user a false warning if the computer clock is ahead or behind. Some embodiments of the present invention envision that the Client software would synchronize local computer clocks with precise time services, such as NIST (National Institute of Standards and Technology) ITS (Internet Time Service) before issuing the warning.

The methods (or various steps thereof) and systems (or various parts thereof) of the present invention can be implemented as "pull" or "push" type methods and systems. The above examples describe some typical variations of the "pull" or "push" methods and systems. Typically "push" methods and systems envision that the Certification Authority knows the location of the Subscriber's or Hosting Provider's servers on the network and "pushes" a subsequent certificate to them.

In the situation when the signing private key of a Certification Authority is compromised, the proposed methods and systems would allow dynamic update of the Subscribers' certificates with the new ones. The new Subscribers' certificates will be signed with the Certification Authority's new digital signature.

The references to the SSL and TLS protocols in the specification are provided as exemplary only, the scope of the patent intends to cover all existing and future implementations of digital certificates and related protocols.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The invention claimed is:

1. A method for dynamically updating digital certificates, comprising the steps of:
   a) issuing a first certificate to a Subscriber, and
   b) issuing and pushing a plurality of subsequent certificates to said Subscriber,
   wherein pushing a plurality of subsequent certificates to said Subscriber comprises the steps of:
      i) determining, by a Certification Authority, if it is time for updating a current certificate,
      ii) in response to the determining that it is said time for updating said current certificate, then proceeding with the following steps,
      iii) pushing, by the Certification Authority, a subsequent certificate to said Subscriber, and
      iv) installing, by the Certification Authority, said subsequent certificate on a Subscriber's server.

2. The method of claim 1, wherein said time for updating said current certificate is before the expiration time of said current certificate.

3. The method of claim 1, wherein said time for updating said current certificate is calculated as the expiration time of said current certificate minus a predetermined time interval.

4. The method of claim 1, wherein said current certificate and said subsequent certificate have overlapping lifespans.

5. The method of claim 1, further comprising the step of:
   c) repeating the steps i) through iv) one or more times.

6. A system for dynamically updating digital certificates comprising:
   a First Communication Link, connecting a Subscriber and a Certification Authority for the purpose of obtaining a first certificate,
   a Subscriber's Communication Software, running on a Subscriber's technological means,
   a Certification Authority's Communication Software, running on a Certification Authority's technological means, and
   a Second Communication Link, connecting said Subscriber's Communication Software and said Certification Authority's Communication Software for the purpose of pushing a plurality of subsequent certificates to said Subscriber's Communication Software,
   wherein the Certification Authority's Communication Software is further configured to:
   determine if it is time for updating a current certificate,
   in response to the determining that it is said time for updating said current certificate, proceed with the following steps,
   push a subsequent certificate to said Subscriber, and
   install said subsequent certificate on a Subscriber's server.

7. The system of claim 6, wherein said First Communication Link at least in part is established via a computer network.

8. The system of claim 7, wherein said computer network at least in part is the Internet.

9. The system of claim 6, wherein said Second Communication Link at least in part is established via a computer network.

10. The system of claim 9, wherein said computer network at least in part is the Internet.

11. A method, comprising the steps of:
a) issuing a digital certificate subscription to a Subscriber, wherein said digital certificate subscription allows for dynamic updates of a Subscriber's certificate on a predetermined time frequency or a predetermined schedule,
b) issuing said Subscriber's certificate via said digital certificate subscription, and
c) pushing said Subscriber's certificate to said Subscriber, wherein pushing said Subscriber's certificate to said Subscriber comprises the steps of:
   i) determining, by a Certification Authority, if it is time for updating a current certificate,
   ii) in response to the determining that it is said time for updating said current certificate, then proceeding with the following steps,
   iii) pushing, by the Certification Authority, a subsequent certificate to said Subscriber, and
   iv) installing, by the Certification Authority, said subsequent certificate on a Subscriber's server.

12. A method, comprising the steps of:
a) obtaining a digital certificate subscription from a Certification Authority, wherein said digital certificate subscription allows for dynamic updates of a Subscriber's certificate on a predetermined time frequency or a predetermined schedule, and
b) accepting said Subscriber's certificate issued via said digital certificate subscription and pushed to a Subscriber by said Certification Authority, wherein pushing a plurality of subsequent certificates to said Subscriber comprises the steps of:
   i) determining, by a Certification Authority, if it is time for updating a current certificate,
   ii) in response to the determining that it is said time for updating said current certificate, then proceeding with the following steps,
   iii) pushing, by the Certification Authority, a subsequent certificate to said Subscriber, and
   iv) installing, by the Certification Authority, said subsequent certificate on a Subscriber's server.

\* \* \* \* \*